United States Patent [19]

Shuttleworth et al.

[11] Patent Number: 5,547,727

[45] Date of Patent: Aug. 20, 1996

[54] OPTICAL RECORDING ELEMENTS HAVING RECORDING LAYERS CONTAINING CATIONIC AZO DYES

[75] Inventors: Leslie Shuttleworth, Webster; Charles H. Weidner, Ontario; Michael P. Cunningham, Rochester, all of N.Y.

[73] Assignee: Eastman Kodak Company, Rochester, N.Y.

[21] Appl. No.: 355,367

[22] Filed: Dec. 13, 1994

[51] Int. Cl.⁶ .................................................. B32B 3/00
[52] U.S. Cl. ...................... 428/64.1; 428/64.2; 428/64.4; 428/64.8; 428/913; 430/270.1; 430/270.11; 430/270.14; 430/945; 430/495.1; 369/283; 369/288
[58] Field of Search .................. 428/64.1, 64.2, 428/64.4, 64.8; 430/270, 495, 945, 270.1, 270.11, 270.14; 369/283, 288

[56] References Cited

U.S. PATENT DOCUMENTS

| | | | |
|---|---|---|---|
| 4,940,618 | 7/1990 | Hamada et al. | 428/64 |
| 5,185,194 | 2/1993 | Miyake | 428/64 |
| 5,246,748 | 9/1993 | Gillberg-Laforce et al. | 428/1 |
| 5,248,538 | 9/1993 | Kovacs | 428/64 |
| 5,272,047 | 12/1993 | Kovacs | 430/495 |
| 5,294,471 | 3/1994 | Evans | 428/64 |

FOREIGN PATENT DOCUMENTS

| | | |
|---|---|---|
| 2005520 | 6/1992 | Canada . |
| 0353393 | 2/1992 | European Pat. Off. . |
| 0557820 | 9/1993 | European Pat. Off. . |

*Primary Examiner*—Newton Edwards
*Assistant Examiner*—Elizabeth Evans
*Attorney, Agent, or Firm*—John R. Everett

[57] ABSTRACT

An optical recording element having a transparent substrate and on the surface of said substrate, a recording layer and a light reflecting layer wherein recording layer comprises a dye selected from the group consisting of cationic azocyanine dyes and mixtures of such dyes and the unrecorded layer is such that the real part of the refractive index (N) at 780 nm is at least 1.8 and the imaginary part (k) is 0.01 to 0.15.

10 Claims, No Drawings

OPTICAL RECORDING ELEMENTS HAVING RECORDING LAYERS CONTAINING CATIONIC AZO DYES

FIELD OF THE INVENTION

The present invention relates to optical recording elements, including recordable optical compact disks.

BACKGROUND OF THE INVENTION

There are many types of optical recording elements known. In many of the elements, the mode of operation requires a recording layer having a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording media which, when recorded in real time, produce a record that mimics the conventional CD on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Elements of this type are described in U.S. Pat. No. 4,940,618, European Patent Application 0,353,393 and Canadian Patent Application 2,005,520.

Commercially useful materials of the type described in these references have stringent requirements. The recording layer must be able to couple with incident laser irradiation to provide features having sufficient reflectivity. The layer must also have good stability towards light, heat and humidity for acceptable shelf life. Since the Photo CD is a consumer product, it must be capable of withstanding extreme environments. Between the time the original images are recorded on the Photo CD and the time subsequent images are recorded, the CD might be placed in strong sunlight.

Most often the active recording layer is an amorphous layer of organic dye or mixture of dyes which owe their optical properties to strong anomalous dispersion (absorption) at wavelength slightly less than that of the desired writing laser, leading to a high real component (N) of the index of refraction and high reflectivity. Absorption of light at the writing laser wavelength (controlled by k, also known as the imaginary component of the index of refraction) must be finite but low, to insure a balance between coupling and reflectivity. High values of N in the recording layer allow the absorption of more light into the layer for a given reflectivity.

Dyes having large values of N at the writing laser wavelength (usually at about 780–800 nm in the near infrared) are not common, and those which have appropriate indices and an efficient mechanism for coupling with the incident laser irradiation to provide significant losses in reflectivity are even rarer.

In the U.S. and the European applications mentioned above, the preferred dyes for the recording layer are indodicarbocyanine dyes. However, this type of dye has less than the desired light stability and will in fact fade to an unusable state after only a few days of intense sunlight exposure.

Thus, there is a continuing need for optical recording materials that have the necessary optical characteristics so that they are CD compatible, can couple with incident laser irradiation to form features with sufficient contrast and yet are light stable. It is to a solution to this problem that the present invention is directed.

SUMMARY OF THE INVENTION

The present invention provides an optical recording element having a transparent substrate and on the surface of said substrate, a recording layer and a light reflecting layer wherein recording layer comprises a dye selected from the group consisting of cationic azocyanine dyes and mixtures of such dyes and the unrecorded layer is such that the real part of the refractive (N) at 780 nm is at least 1.8 and the imaginary part (k) is between 0.01 and 0.15.

The cationic azocyanine perform as the recording dye in the optical elements of the invention. They exhibit (a) improved stability relative to other classes of cationic dyes and (2) exhibit significantly improved light stability relative to the cationic cyanine dyes of the prior art.

DETAILS OF THE INVENTION

The cationic azocyanine dyes are employed singly or in combination with other cationic azo dyes as the recording layer of an optical recording element.

Representative azocyanine dyes from which useful dyes can be selected conform to structure I.

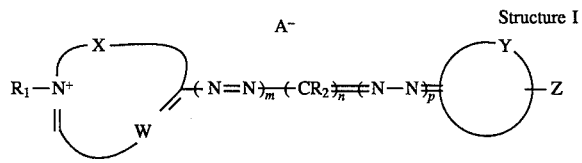

Structure I

W and X together represent the atoms needed to complete a substituted or unsubstituted heterocyclic ring such as thiazole, isothiazole, 1,3,4-thiadiazole, 1,3,4-triazole, benzothiazole, naphthiazole and benzisothiazole;

Y represents the atoms needed to complete a $C_6$ to $C_{10}$, substituted or unsubstituted, carbocyclic ring such as phenyl, naphthyl, dialkylaminophenyl, N-pyrazolylphenyl, 5-acetamido-2-methoxy-N,N-dibutylaniline, N-phenylthiomorpholine-1,1-dioxide, N-acetoxyethyl-N-ethylaniline, N-methyl-2-methylaniline, a heterocyclic ring such as benzothiazole, benzoxazole, N-benzyl-2,2,4-trimethyl-1,2-dihydroquinoline, N-phenethyl-2,2,4-trimethyl-1,2-dihydroquinoline, N-butyl-2,2,4-trimethyl-1,2-dihydroquinoline, N-acetoxyethyl-2,2,4-trimethyl-1,2-dihydroquinoline, N-hydroxyethyl-2,7-dimethyl-1,2,3,4-tetrahydroquinoline or julolidine, or a substituted or unsubstituted diphenyl methylidene such as bis(4-N,N-dimethylaminophenyl)methylidene, or (4-N,N-dimethylaminophenyl)phenyl methylidene;

Z represents hydrogen, OH or $NR_3R_4$;

A represents an anion such perchlorate, trifluoromethanesulfonate, methosulfate, azide, bromide, iodide, or tetrafluoborate.

$R_1$ represents alkyl of from 1–4 carbon atoms;

$R_2$ represents H, alkyl of from 1–4 carbon atoms, phenyl, 4-cyanophenyl, or 4-nitrophenyl;

$R_3$ and $R_4$, each independently, represent hydrogen, alkyl of from 1–4 carbon atoms, substituted alkyl such as acetoxyethyl or hydroxyethyl, substituted and unsubstituted benzyl such as 4-methylbenzyl, 4-chlorobenzyl, 4-nitrobenzyl, substituted or unsubstituted phenethyl, such as 4-methylphenethyl, 4-chlorophenethyl or 4-nitrophenethyl; or $R_3$ may combine with $R_4$ to form a substituted or unsubstituted pyrazole ring such as 4,5-dihydro-1,3,5-triphenyl-1H-pyrazole, thiomorpholine-1,1-dioxide; or $R_3$ alone, or $R_4$ alone, or $R_3$ and $R_4$ together, may combine with Y to form a heterocyclic ring such as substituted or unsubstituted quinoline, dihydroquinoline, tetrahydroquinoline or julolidine;

m=1; and n and p represent 0 or 1 provided that when n equals 0, p must be 0.

The following tables I–IV present representative examples of useful cationic dyes, according to the invention. Where indicated, diazonium component refers to the portion of the dye molecule derived from a diazonium salt, and coupler component refers to that portion of the dye molecule with which the diazonium salt was treated to form the dye.

An embodiment of general structure (I), in which the cationic heterocycle was varied while keeping the coupler component constant is presented in Structure II:

Structure II

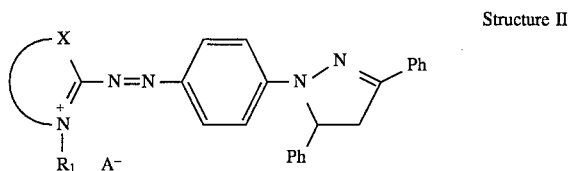

wherein

X, together with $N^+$, represents a substituted or unsubstituted heterocylic component such as benzothiazole, triazole, thiadiazole, or thiazole;

Ph represents phenyl and $A^-$ represents $ClO_4^-$, $CF_3SO_3^-$, or $CH_3OSO_3^-$.

Representative Structure II compounds are presented in Table I.

TABLE I

| Dye No. | Diazonium Component | Coupler Component | $R_1$ | A | $\lambda_{max}$ (nm) |
|---|---|---|---|---|---|
| 1 | 2-(6-Nitrobenzothiazole) | 4,5-Dihydro-1,3,5-Triphenyl-1H-Pyrazole | Me | $ClO_4$ | 631 |
| 2 | 2-(6-Nitrobenzothiazole) | 4,5-Dihydro-1,3,5-Triphenyl-1H-Pyrazole | Me | $MeOSO_3$ | 631 |
| 3 | 2-(6-Nitrobenzothiazole) | 4,5-Dihydro-1,3,5-Triphenyl-1H-Pyrazole | Me | $CF_3SO_3$ | 631 |
| 4 | 2-(Benzothiazole) | 4,5-Dihydro-1,3,5-Triphenyl-1H-Pyrazole | Me | $MeOSO_3$ | 672 |
| 5 | 2-(6-Methylbenzothiazole) | 4,5-Dihydro-1,3,5-Triphenyl-1H-Pyrazole | Me | $MeOSO_3$ | 678 |
| 6 | 2-(6-Methoxybenzothiazole) | 4,5-Dihydro-1,3,5-Triphenyl-1H-Pyrazole | Me | $MeOSO_3$ | 690 |
| 7 | 2-(6-Chlorobenzothiazole) | 4,5-Dihydro-1,3,5-Triphenyl-1H-Pyrazole | Me | $MeOSO_3$ | 675 |
| 8 | 2-(5-Methyl-1,3,4-thiadiazole) | 4,5-Dihydro-1,3,5-Triphenyl-1H-Pyrazole | Et | $MeOSO_3$ | 604 |
| 9 | 2-(5-Ethylthio-1,3,4-thiadiazole) | 4,5-Dihydro-1,3,5-Triphenyl-1H-Pyrazole | Me | $MeOSO_3$ | 661 |
| 10 | 5-(3-Methyl-4-cyanoisothiazole) | 4,5-Dihydro-1,3,5-Triphenyl-1H-Pyrazole | Me | $MeOSO_3$ | 685 |
| 11 | 2-(5-Methyl-1,3,4- | 4,5-Dihydro-1,3,5- | Me | $MeOSO_3$ | 635 |

TABLE I-continued

| Dye No. | Diazonium Component | Coupler Component | $R_1$ | A | $\lambda_{max}$ (nm) |
|---|---|---|---|---|---|
|  | triazole) | Triphenyl-1H-Pyrazole |  |  |  |
| 12 | 2-(4-Methyl-thiazole) | 4,5-Dihydro-1,3,5-Triphenyl-1H-Pyrazole | Me | MeOSO$_3$ | 648 |

Me represents methyl and Et represents ethyl.

Another embodiment of general structure (I) is presented in Structure III.

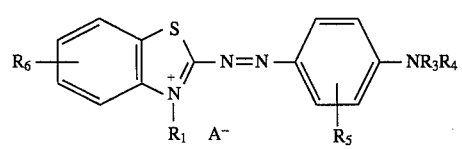

Structure III wherein $R_3$ and $R_4$, each independently, represent hydrogen, alkyl of from 1–4 carbon atoms, substituted alkyl such as acetoxyethyl or hydroxyethyl, substituted and unsubstituted benzyl such as 4-methylbenzyl, 4chlorobenzyl, 4-nitrobenzyl, substituted or unsubstituted phenethyl, 4-methylphenethyl, 4-chlorophenethyl or 4-nitrophenethyl; or $R_3$ alone, or $R_4$ alone, or $R_3$ and $R_4$ together, may combine with the phenyl ring to form a heterocyclic ring such as substituted or unsubstituted quinoline, dihydroquinoline, tetrahydroquinoline or julolidine;

$R_5$ represents H, alkyl of from 1–4 carbon atoms, methoxy, chloro, or acetamido;

$R_6$ represents H, alkyl, alkoxy, or the atoms necessary to provide a fused benzo ring;

$A^-$ represents $N_3^-$, $ClO_4^-$, $CF_3SO_3^-$, or $CH_3OSO_3^-$.

Representative Structure II compounds are presented in Table II.

TABLE II

| Dye No. | Diazonium Component (incorporates $R_6$) | Coupler Component (incorporates NR$_3$R$_4$, and R$_5$ together) | $R_1$ | A | $\lambda_{max}$ (nm) |
|---|---|---|---|---|---|
| 13 | 2-(6-Methoxy-benzothiazole) | N-Benzyl-2,2,4-trimethyl-1,2-dihydroquinoline | Me | N$_3$ | 648 |
| 14 | 2-(6-Methoxy-benzothiazole) | N-Benzyl-2,2,4-trimethyl-1,2-dihydroquinoline | Me | ClO$_4$ | 648 |
| 15 | 2-(6-Methoxy-benzothiazole) | N-Phenethyl-2,2,4-trimethyl-1,2-dihydroquinoline | Me | N$_3$ | 646 |
| 16 | 2-(4,6-Dimethoxy-benzothiazole) | N-Phenethyl-2,2,4-trimethyl-1,2-dihydroquinoline | Me | ClO$_4$ | 651 |
| 17 | 2-(6-Methoxy-benzothiazole) | N-Butyl-2,2,4-trimethyl-1,2-dihydroquinoline | Me | MeOSO$_3$ | 642 |
| 18 | 2-(6-Methoxy-benzothiazole) | N-Butyl-2,2,4-trimethyl-1,2-dihydroquinoline | Me | N$_3$ | 637 |
| 19 | 2-(6-Methoxy-benzothiazole) | N-Phenethyl-2,2,4-trimethyl-1,2-dihydroquinoline | Me | ClO$_4$ | 647 |
| 20 | 2-(6-Methoxy-benzothiazole) | Julolidine | Me | ClO$_4$ | 612 |
| 21 | 2-(6-Methoxy-benzothiazole) | 5-Acetamido-2-methoxy-N,N-dibutylaniline | Me | ClO$_4$ | 607 |
| 22 | 2-(6-Methoxy-benzothiazole) | N-Butyl-2,2,4-trimethyl-1,2-dihydroquinoline | Me | ClO$_4$ | 637 |
| 23 | 2-(6-Methoxy-benzothiazole) | N-Acetoxyethyl-2,2,4-trimethyl-1,2-dihydroquinoline | Me | ClO$_4$ | 644 |
| 24 | 2-Naphthiazole | N-Benzyl-2,2,4-trimethyl-1,2-dihydroquinoline | Me | ClO$_4$ | 659 |
| 25 | 2-Naphthiazole | N-Phenethyl-2,2,4-trimethyl-1,2-dihydroquinoline | Me | ClO$_4$ | 657 |
| 26 | 2-Naphthiazole | N-Benzyl-2,2,4-trimethyl-1,2-dihydroquinoline | Me | MeOSO$_3$ | 659 |

Me represents methyl.

Another embodiment of general structure (I) is presented in Structure IV.

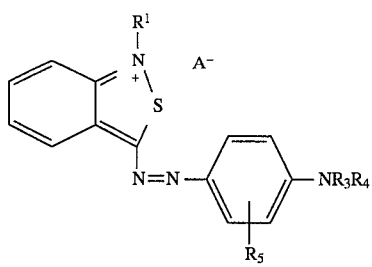

Structure IV wherein

R1 represents alkyl of 1 to 4 carbon atoms;

$R_3$ and $R_4$, each independently, represent hydrogen, alkyl of from 1–4 carbon atoms, substituted alkyl such as acetoxyethyl or hydroxyethyl, substituted and unsubstituted benzyl such as 4-methylbenzyl, 4-chlorobenzyl, 4-nitrobenzyl, substituted or unsubstituted phenethyl, 4-methylphenethyl, 4-chlorophenethyl or 4-nitrophenethyl; or $R_3$ may combine with $R_4$ to form a substituted or unsubstituted pyrazole ring such as 4,5-dihydro-1,3,5-triphenyl-1H-pyrazole, thiomorpholine-1,1-dioxide; or $R_3$ alone, or $R_4$ alone, or $R_3$ and $R_4$ together, may combine with the phenyl ring to form a heterocyclic ring such as substituted or unsubstituted quinoline, dihydroquinoline, tetrahydroquinoline or julolidine;

$R_5$ represents H, alkyl of from 1–4 carbon atoms, methoxy, chloro, or acetamido;

$A^-$ represents $ClO_4^-$, $CF_3SO_3^-$, or $CH_3OSO_3^-$.

Representative examples of Structure IV compounds in which the cationic heterocycle is a 2,1-benzisothiazole, and the coupler component is varied are shown in Table III.

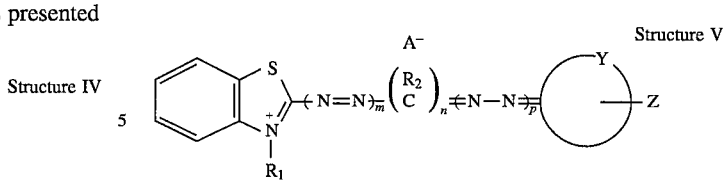

Structure V wherein $A^-$ represents $ClO_4^-$, $CF_3SO_3^-$, or $CH_3OSO_3^-$;

$R_1$ represents alkyl of from 1 to 4 carbon atoms;

$R_2$ represents H, alkyl of from 1–4 carbon atoms, phenyl, 4-cyanophenyl, or 4-nitrophenyl;

Y represents substituted or unsubstituted benzothiazole, benzoxazole or diphenyl methylidene;

Z represents hydrogen, amino, or dialkylamino wherein alkyl is from 1 to 4 carbon atoms;

m represents 1;

n represents 1; and p represents 0 or 1.

Representative examples of structure V are presented in Table IV in which the cationic heterocycle is benzothiazole and the group represented by Y/Z is varied.

TABLE III

| Dye No. | Diazonium Component | Coupler Component (incorporated $NR_3R_4$, and $R_5$) | $R_1$ | A | $\lambda_{max}$ (nm) |
|---|---|---|---|---|---|
| 27 | 3-(2,1-Benz-isothiazole) | 4,5-Dihydro-1,3,5-Triphenyl-1H-Pyrazole | Me | $MeOSO_3$ | 720 |
| 28 | 3-(2,1-Benz-isothiazole) | N-Phenylthio-morpholine-1,1-dioxide | Me | $ClO_4$ | 647 |
| 29 | 3-(2,1-Benz-isothiazole) | N-Hydroxyethyl-2,7-dimethyl-1,2,3,4-tetrahydroquinoline | Me | $ClO_4$ | 692 |
| 30 | 3-(2,1-Benz-isothiazole) | N-Acetoxyethyl-N-ethylaniline | Me | $ClO_4$ | 681 |
| 31 | 3-(2,1-Benz-isothiazole) | N-Methyl-2-methylaniline | Me | $ClO_4$ | 669 |

Me represents methyl.

Another embodiment of general structure I is presented with structure V.

TABLE IV

| Dye No. | Cationic Heterocycle | Y/Z | $R_1$ | $R_2$ | m | n | p | A | $\lambda_{max}$ (nm) |
|---|---|---|---|---|---|---|---|---|---|
| 32 | 2-Benzothiazole | 2-(N-Methyl-benzothiazole) | Me | H | 1 | 1 | 1 | $ClO_4$ | 668 |
| 33 | 2-Benzothiazole | 2-(N-Methyl-benzoxazole) | Me | H | 1 | 1 | 1 | $ClO_4$ | 665 |
| 34 | 2-Benzothiazole | 2-(N-Methyl-benzothiazole) | Me | 4-Nitro-phenyl | 1 | 1 | 1 | $ClO_4$ | 660 |
| 35 | 2-Benzothiazole | 2-(N-Methyl-benzothiazole) | Me | 4-Cyano-phenyl | 1 | 1 | 1 | $ClO_4$ | 661 |
| 36 | 2-Benzothiazole | Bis(4-N,N- | Me | H | 1 | 1 | 0 | $ClO_4$ | 636 |

TABLE IV-continued

| Dye No. | Cationic Heterocycle | Y/Z | $R_1$ | $R_2$ | m | n | p | A | $\lambda_{max}$ (nm) |
|---|---|---|---|---|---|---|---|---|---|
| 37 | 2-Benzothiazole | dimethylamino-phenyl)methane (4-N,N-Dimethyl-aminophenyl)-phenylmethane | Me | H | 1 | 1 | 0 | ClO$_4$ | 674 |

Me represents methyl.

Cationic dyes 1–31 of this invention may be made using standard dye-forming reactions known in the art, by coupling a diazonium salt with an electron-rich coupler, followed by quaternization of the dye base with an appropriate alkylating agent. Examples of dyes prepared in this manner are described in *Topics in Applied Chemistry: The Chemistry and Application of Dyes*, D. R. Waring and G. Hallas, Eds., Plenum Press, New York, Chap. 5, p. 199 (1990). Some representative preparatory examples follow.

PREPARATIVE EXAMPLE 1

To a suspension of 2-aminobenzothiazole (3 g, 0.02 mol) in 50 mL H$_2$O, was added 28 mL of H$_2$SO$_4$ portion wise with external cooling. Nitrosylsulfuric acid (0.021 mol) was added in portions to this mixture, so as to maintain temperature below 5° C., and this mixture was stirred an additional 2 hr at 0°–5° C. The mixture containing the diazonium salt was then added to a 0° C. mixture of 4,5-dihydro-1,3,5-triphenyl-1H-pyrazole (5.96 g, 0.02 mol) and sodium acetate (100 g) in 150 mL 3:1 (v:v) tetrahydrofuran/methanol. The purple mixture was allowed to stir for 1 hr, poured into excess H$_2$O, and the solid precipitate was filtered and dried. This was purified by column chromatography to provide 3.2 g (35%) of azo dye.

A solution of the above azo dye (1.0 g, 0.0022 mol) in 15 mL of dry 1,2-dichloroethane was treated with dimethylsulfate (2.0 g, excess), and the mixture was heated at reflux for 16 hr. The mixture was concentrated to about half volume, and then poured into excess diethyl ether to precipitate crude dye as a gummy solid. This was recrystallized from MeOH to provide 1.2 g (94%) of dye 4 as green crystals.

PREPARATIVE EXAMPLE 2

To a 5:1 (v/v) mixture of acetic/propionic acid (20 mL) containing nitrosylsulfuric acid (0.02 mol) at 5° C. was added 2-amino-4-methyl thiazole (2.28 g, 0.02 mol) in portions so as to maintain the temperature of the reaction mixture below 10° C. This was stirred for 2 hr at 0°–5° C. and then added all at once to a precooled (ice) mixture of 4,5-dihydro-1,3,5-triphenyl-1H-pyrazole (5.96 g, 0.02 mol) and NaOAc (100 g, excess) in 150 mL of 3:1 THF/methanol. The red mixture was stirred an additional 1.5 hr, poured into excess water to precipitate dye, which was filtered and dried. The dye was purified by chromatography (SiO$_2$, CH$_2$Cl$_2$) followed by recrystallization from MeOH, to provide 1.0 g of pure dye.

A solution of the above azo dye (0.75 g, 0.0018 mol) in 10 mL dry 1,2-dichloroethane was treated with dimethylsulfate (2.0 g, excess), and then heated to reflux for 16 hr. TLC indicated complete consumption of starting dye, and the mixture was poured into excess Et$_2$O to precipitate the product. This was purified by redissolving into a minimum amount of methanol, and pouring this into ethyl acetate to precipitate pure dye.

PREPARATIVE EXAMPLE 3

2-Amino naphth[1,2]thiazole (2.0 g, 0.01 moles) was dissolved in 60% aqueous acetic acid and sulfuric acid (10 g) was added. The sulfate salt precipitated. The mixture was stirred and cooled to 5° C. and nitrosyl sulfuric acid (1.5 g) was added slowly at this temperature. The mixture was allowed to diazotize for 4–5 hours and was then added to a solution of N-phenethyl-2,2,4-trimethyl dihydroquinoline (2.63 g, 0.01 moles) in acetic acid (about 200 mL). Coupling was allowed to proceed at RT for 12 hours. Water (200 mL) was then added slowly to precipitate the dye. The dye was filtered, washed with water and dried.

The azo dye prepared above, (1.0 g) was dissolved in acetic acid (15 mL) and dimethyl sulfate (1.5 g, excess) was added together with magnesium oxide (0.25 g). The mixture was heated on a steam bath for 3 hr, cooled, and filtered and washed with 15 ml of acetic acid. A little water (about 15 mL) was added to the liltrate and the filtrate heated. Sodium perchlorate (2.0 g) and a little water was added, and the mixture ice cooled. The solid dye which precipitated was filtered off, washed with water and dried.

PREPARATIVE EXAMPLE 4

2-Amino6-methoxy benzothiazole (1.8 g) was dissolved in 60% acetic acid (30 g), and sulfuric acid (2.0 g) was added. The mixture was cooled to below 5° C., and then nitrosyl sulfuric acid (1.5 g), was added slowly. The mixture was allowed to diazotize for 2–3 hr. The coupler, N-benzyl-2,2,4-trimethyl dihydroquinoline, was added to acetic acid (200 mL) and heated gently to dissolve. The diazo solution prepared as above was then added dropwise to the coupler solution. The mineral acid in the mixture was neutralized via addition of a chilled solution of sodium hydroxide and the mixture stirred. The precipitated dye was filtered, washed with water and dried.

The azo dye prepared as above (0.75 g) was dissolved in acetic acid (15 mL) and dimethyl sulfate, (0.75 g) and magnesium oxide (0.12 g) were added. The solution was heated on a steam bath for 2–3 hr. TLC of the mixture indicated complete reaction. A mixture of 50 mL acetic acid and 50 mL water were then added to the cooled reaction mixture, and the solution filtered. Sodium perchlorate (6 g) was then added and the precipitated dye was filtered, washed with water and dried.

Dyes 32–37 of this invention were prepared following the procedures outlined in one of the following references: *Ann. Chem.* 1957, 609, 143; *Ann. Chem.* 1957, 609, 160; *Ann. Chem.* 1957, 609, 172.

Optical Recording Elements

The optical elements of the invention comprise a light transmitting, typically pregrooved substrate, the cationic azocyanine dye light absorptive layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. The recording layer containing the cationic azocyanine dye has a real part of the complex refractive index (N) of the unwritten light absorptive layer measured with 780 nm light of not less than 1.8 and the imaginary part (k) of not greater than 0.15 nor less than 0.01.

The substrate may be any transparent material that satisfies the mechanical and optical requirements. The substrates are generally pregrooved with groove depths from 20 nm to 250 nm, groove widths 0.2 to 1 μm and a pitch 1 to 2μm. The preferred material is polycarbonate, other materials are glass, polymethylmethacrylate and other suitable polymeric materials.

The preparation of the optical recording element of the invention is achieved by spin coating of the cationic azocyanine dye by itself, or with another dye or other dyes or with addenda from a suitable solvent onto a transparent substrate. For coating, the cationic azocyanine dye with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methyl ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminum, copper and alloys thereof.

The protective layer over the reflective layer is similarly conventional for this art. Useful materials include UV curable acrylates.

One preferred protective layer is disclosed in commonly assigned U.S. patent application 815,020, filed Dec. 27, 1991 in the names of Kosinski and Amell. This application discloses a two layer structure in which the layer adjacent to the reflective layer is spin coated and the second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

Preparation of Optical Recording Elements

For each of the cationic azo dyes studied, an optical recording element was prepared by first dissolving the dye in an appropriate solvent (typically 2,2,3,3-tetrafluoro-1-propanol (TFP)) and spin coating the solution onto silicon wafers. Spectroscopic ellipsometric analysis of the coated wafers provided the dispersion characteristics. The film thickness corresponding to the first reflectance maximum at 780 nm in a writeable CD element was calculated. By means of spin coating, films of the dye on smooth (unfeatured) polycarbonate blanks at the appropriate film thickness were prepared. Such methods are well known to those skilled in the spin coating art. A complete element was prepared by applying 100 nm of gold to the dye film by thermal evaporation and the gold layer was overcoated with 5μm of a photocrosslinkable lacquer (Daicure SD-17).

The element was tested with an optical recording system based on a 780 nm diode laser operating at record powers up to 18 mw while the disk spun at a constant linear velocity of 2.8 m/sec. The record pattern was an alternating sequence of I11 marks and lands (as described in ISO 10149) at 50% duty cycle. At each record power level, the readback signal (the RF waveform was generated by the same laser operating at low power) was captured by a spectrum analyzer which yielded the strength of the signal (I11/Itop as described in ISO 10149).

UTILITY EXAMPLES 1–13

For each dye tested, the reflectance ($R_0$) of the element at 780 nm, the recording contrast (I11/Itop) at 14 mw record power and the sensitivity of the element (SS is the record power at which carrier exceeds −10 dBm) were noted. For dyes of the present invention, the results in Table V were obtained.

TABLE V

| | Cationic Azo Dyes Performance Data | | | | |
|---|---|---|---|---|---|
| Example No. | Dye | N 780 nm | k 780 nm | $R_o$ (%) 780 nm | SS | I11/Itop. @ 14 mw |
| 1 | 4 | 2.54 | 0.185 | 66.5 | 10.8 | 0.55 |
| 2 | 12 | 2.18 | 0.060 | 80.6 | 13.3 | 0.36 |
| 3 | 13 | 1.85 | 0.005 | | | |
| 4 | 6 | 2.37 | 0.176 | 64.3 | 8.1 | 0.65 |
| 5 | 2 | 2.31 | 0.163 | 65.5 | 10.3 | 0.42 |
| 6 | 15 | 1.89 | 0.018 | 70.7 | 8.3 | 0.82 |
| 7 | 1 | 2.49 | 0.103 | | | |
| 8 | 14 | 2.18 | 0.028 | 79.1 | 11.1 | 0.42 |
| 9 | 16 | 2.11 | 0.036 | 81.0 | | 0.20 |
| 10 | 24 | 2.29 | 0.164 | 76.0 | 8.8 | 0.47 |
| 11 | 25 | 2.27 | 0.076 | 76.7 | | 0.36 |
| 12 | 26 | 2.19 | 0.070 | 71.9 | | 0.21 |
| 13 | 19 | 2.13 | 0.030 | 79.6 | 12.7 | 0.52 |

The above data of Table V demonstrates the operability of the dyes of this invention having the required N and k values. Dyes outside the invention i.e. dye #3 do not record.

Example 3 (dye 13) had low K (outside the scope of the invention); did not absorb light and was not recordable.

Example 7 (dye 1) had adequate optical properties but was poorly soluble in our coating solvents and could not be tested.

Example 9 (dye 16) during testing the fundamental did not reach −10 dBm and no SS was therefore recorded.

Example 11 (dye 25) during testing the fundamental did not reach −10 dBm and no SS therefore recorded.

Example 12 (dye 26) during testing the fundamental did not reach −10 dBm and no SS was therefore recorded.

UTILITY EXAMPLE 14

The performance data of an optical recording layer containing a cationic azo dye combined with an auxiliary dye is presented below.

| Cationic dye | Auxiliary dye | Cationic: Auxiliary ratio | $R_o$ (%) 780 nm | SS | 111/Itop @ 14 mw |
|---|---|---|---|---|---|
| 14 | CD-1 | 4:1 | 83 | 9 | 0.48 |

CD-1 is a cyanine dye having the following structure:

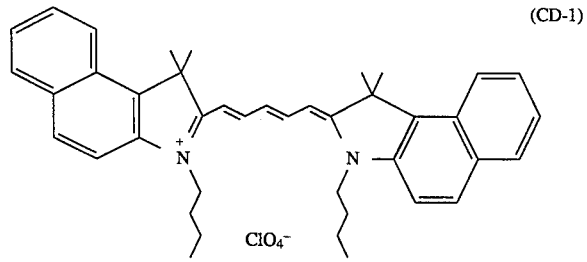

(CD-1)

UTILITY EXAMPLES 15–26

The light stability of the cationic dyes were compared by coating the dyes on a 2"×2" (5.1 cm×5.1 cm) piece of polycarbonate (approximately ⅛" or 3.2 mm thick) and exposing the sample to a 50 Klux Xenon light source with the sample mounted such that exposure occurred through the uncoated surface (i.e. coated side away from the light source). The dye losses which resulted are compiled in Table VI:

TABLE VI

Cationic Azo Dye Light Stability

| Example No. | Cationic Azo Dye | % Absorbency loss at lambda max. | | | |
|---|---|---|---|---|---|
| | | 1 day | 3 days | 7 days | 14 days |
| CD-1 Control | none | 73 | 100 | — | — |
| 15 | 4 | 8 | 19 | 29 | 75 |
| 16 | 12 | 96 | 100 | — | — |
| 17 | 13 | 35 | 38 | 55 | 78 |
| 18 | 6 | 6 | 13 | 30 | 92 |
| 19 | 2 | 4 | 12 | 25 | 86 |
| 20 | 15 | 29 | 54 | 89 | 100 |
| 21 | 1 | 8 | 16 | 30 | 53 |
| 22 | 14 | 12 | 38 | 58 | 75 |
| 23 | 16 | NM | NM | 32 | 48 |
| 24 | 24 | 5 | 18 | 46 | 70 |
| 25 | 25 | 6 | 22 | 53 | 77 |
| 26 | 26 | 2 | 6 | 27 | 63 |

NM represents not measured.

Compared to the cyanine dyes described in the prior art (CD-1 is typical of prior art cyanines), the cationic azo dyes are seen to afford much improved stability.

The invention has been described in detail with particular reference to preferred embodiments thereof, but it will be understood that variations and modifications can be effected within the spirit and scope of the invention.

We claim:

1. An optical recording element having a transparent substrate and on the surface of said substrate, a recording layer and a light reflecting layer wherein:
   (A) the unrecorded layer is such that the real part of the refractive (N) at 780 nm is at least 1.8 and the imaginary part (k) is 0.01 to 0.15 and
   (B) the recording layer comprises a cationic azocyanine having the structure I:

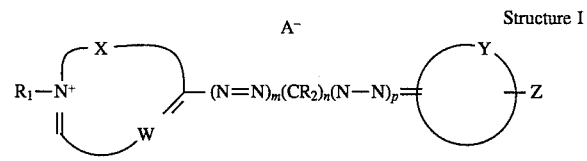

Structure I

W and X together represent the atoms needed to complete a substituted or unsubstituted heterocyclic ring;

Y represents the atoms needed to complete a $C_6$ to $C_{10}$, substituted or unsubstituted, carbocyclic ring such as phenyl, naphthyl, dialkylaminophenyl, N-pyrazolylphenyl, 5-acetamido-2-methoxy-N,N-dibutylaniline, N-phenylthiomorpholine-1,1-dioxide, N-acetoxyethyl-N-ethylaniline, N-methyl-2-methylaniline, a heterocyclic ring such as benzothiazole, benzoxazole, N-benzyl-2,2,4-trimethyl-1,2-dihydroquinoline, N-phenethyl-2,2,4-trimethyl-1,2-dihydroquinoline, N-butyl-2,2,4-trimethyl-1,2-dihydroquinoline, N-acetoxyethyl-2,2,4-trimethyl-1,2-dihydroquinoline, N-hydroxyethyl-2,7-dimethyl-1,2,3,4-tetrahydroquinoline or julolidine, or a substituted or unsubstituted diphenyl methylidene such as bis (4-N,N-dimethylaminophenyl)methylidene, or (4-N,N-dimethylaminophenyl)phenyl methylidene;

Z represents hydrogen, OH or $NR_3R_4$;

A represents an anion;

$R_1$ represents alkyl of from 1–4 carbon atoms;

$R_2$ represents H, alkyl of from 1–4 carbon atoms, phenyl, 4-cyanophenyl, or 4-nitrophenyl;

$R_3$ and $R_4$, each independently, represent hydrogen, alkyl of from 1–4 carbon atoms, substituted alkyl, substituted or unsubstituted benzyl, substituted or unsubstituted phenethyl, 4-methylphenethyl, 4-chlorophenethyl or 4-nitrophenethyl; or $R_3$ may combine with $R_4$ to form a substituted or unsubstituted pyrazole ring; or $R_3$ alone, or $R_4$ alone, or $R_3$ and $R_4$ together, may combine with Y to form a heterocyclic ring;

m=1; and n and p represent 0 or 1 provided that when n equals 0, p must be 0.

2. The element of claim 1 wherein the cationic dye has the structure II as follows:

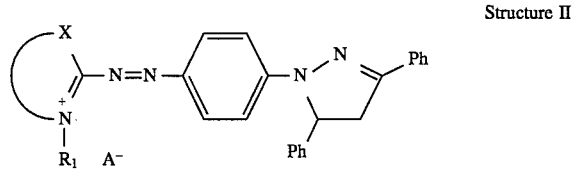

Structure II wherein

X, together with $N^+$, represents a substituted or unsubstituted heterocylic component;

Ph represents phenyl and $A^-$ represents $ClO_4^-$, $CF_3SO_3^-$, or $CH_3OSO_3^-$.

3. An element according to claim 2 wherein the cationic dye has the structure IV:

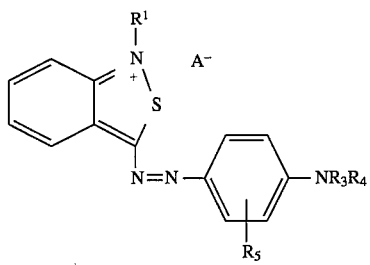

Structure IV wherein

R1 represents alkyl of 1 to 4 carbon atoms;

$R_3$ and $R_4$, each independently, represent hydrogen, alkyl of from 1–4 carbon atoms, substituted alkyl; substituted or unsubstituted benzyl; substituted or unsubstituted phenethyl, 4-methylphenethyl, 4-chlorophenethyl or 4-nitrophenethyl; or $R_3$ may combine with $R_4$ to form a substituted or unsubstituted pyrazole ring; or $R_3$ alone, or $R_4$ alone, or $R_3$ and $R_4$ together, may combine with the phenyl ring to form a heterocyclic ring;

$R_5$ represents H, alkyl of from 1–4 carbon atoms, methoxy, chloro, or acetamido;

$A^-$ represents $ClO_4^-$, $CF_3SO_3^-$, or $CH_3OSO_3^-$.

4. The element according to claim 3 wherein the cationic dye is selected from Table III.

5. The element according to claim 2 wherein the cationic dye is selected from Table I.

6. An element according to claim 1 wherein the cationic dye has the structure III

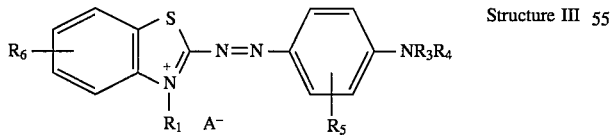

Structure III wherein $R_3$ and $R_4$, each independently, represent hydrogen, alkyl of from 1–4 carbon atoms, substituted alkyl; substituted or unsubstituted phenethyl, 4-methylphenethyl, 4-chlorophenethyl or 4-nitrophenethyl; or $R_3$ alone, or $R_4$ alone, or $R_3$ and $R_4$ together, may combine with the phenyl ring to form a heterocyclic ring;

$R_5$ represents H, alkyl of from 1–4 carbon atoms, methoxy, chloro, or acetamido;

$R_6$ represents H, alkyl, alkoxy, or the atoms necessary to provide a fused benzo ring;

$A^-$ represents $N_3^-$, $ClO_4^-$, $CF_3SO_3^-$, or $CH_3OSO_3^-$.

7. The element according to claim 6 wherein the cationic dye is selected from Table II.

8. An element according to claim 1 wherein the cationic dye has the structure V:

TABLE III

| Dye No. | Diazonium Component | Coupler Component (incorporated $NR_3R_4$, and $R_5$) | $R_1$ | A | $\lambda_{max}$ (nm) |
|---|---|---|---|---|---|
| 27 | 3-(2,1-Benz-isothiazole) | 4,5-Dihydro-1,3,5-Triphenyl-1H-Pyrazole | Me | $MeOSO_3$ | 720 |
| 28 | 3-(2,1-Benz-isothiazole) | N-Phenylthio-morpholine-1,1-dioxide | Me | $ClO_4$ | 647 |
| 29 | 3-(2,1-Benz-isothiazole) | N-Hydroxyethyl-2,7-dimethyl-1,2,3,4-tetrahydroquinoline | Me | $ClO_4$ | 692 |
| 30 | 3-(2,1-Benz-isothiazole) | N-Acetoxyethyl-N-ethylaniline | Me | $ClO_4$ | 681 |
| 31 | 3-(2,1-Benz-isothiazole) | N-Methyl-2-methylaniline | Me | $ClO_4$ | 669 |

Me represents methyl.

wherein $A^-$ represents $ClO_4^-$, $CF_3SO_3^-$, or $CH_3OSO_3^-$;

$R_1$ represents alkyl of from 1 to 4 carbon atoms;

$R_2$ represents H, alkyl of from 1–4 carbon atoms, phenyl, 4-cyanophenyl, or 4-nitrophenyl;

Y represents substituted or unsubstituted benzothiazole, benzoxazole or a substituted or unsubstituted diphenyl methylidene such as bis(4-N,N-dimethylaminophenyl) methylidene, or (4-N,N-dimethylaminophenyl)phenyl methylidene;

Z represents hydrogen, amino, or dialkylamino wherein alkyl is from 1 to 4 carbon atoms;

m represents 1;

n represents 1; and p represents 0 or 1.

9. The element according to claim 8 wherein the cationic dye is selected from Table IV.

10. The element of any one of the preceding claims wherein the recording layer includes a mixture of the cationic dyes.

* * * * *